No. 771,292. PATENTED OCT. 4, 1904.
L. ZEYEN.
SIEVE CYLINDER FOR PAPER MAKING MACHINES.
APPLICATION FILED JAN. 15, 1904.
NO MODEL.

Witnesses.

Inventor.
Leopold Zeyen
per Richards
Attorneys

No. 771,292.

Patented October 4, 1904.

UNITED STATES PATENT OFFICE.

LEOPOLD ZEYEN, OF RAGUHN, GERMANY.

SIEVE-CYLINDER FOR PAPER-MAKING MACHINES.

SPECIFICATION forming part of Letters Patent No. 771,292, dated October 4, 1904.

Application filed January 15, 1904. Serial No. 189,160. (No model.)

*To all whom it may concern:*

Be it known that I, LEOPOLD ZEYEN, kommerzienrat, a subject of the Duke of Anhalt, residing in the city of Raguhn, Dukedom of Anhalt, Germany, have invented a new and useful Improvement in Sieve-Cylinders for Paper-Making Machines, of which the following is a specification.

This invention relates to a sieve-cylinder for cylinder paper-making machines, and essentially consists in the most suitable construction of the sieve-cylinder. The body of the cylinder is made out of a number of circular rings of U-shaped cross-section arranged side by side, so that they form a cylinder. The inwardly-extending flanges of the rings are fastened together by screw-bolts or the like, while the smooth outer surfaces of the bends of the U-section together form a smooth cylindrical body, which at the same time serves as a supporting-surface for a coarse under sieve and for a fine sieve placed over the coarser one. The coarse under sieve may be made of strong wire-gauze having a coarse mesh and the overlying sieve of wire-gauze having a suitable fine mesh; but I do not restrict myself to wire-gauze only nor to the number of covering-sieves. The cylinder built up by the said U-shaped rings is mounted on a central rotating shaft. The cylinder is fastened to the shaft by cross-arms or in any other suitable manner. The surfaces and flanges of the said rings forming the cylinder are perforated to permit of the passage of the liquid used in the manufacture.

The object of this invention is shown in the accompanying drawings, of which—

Figure 1:
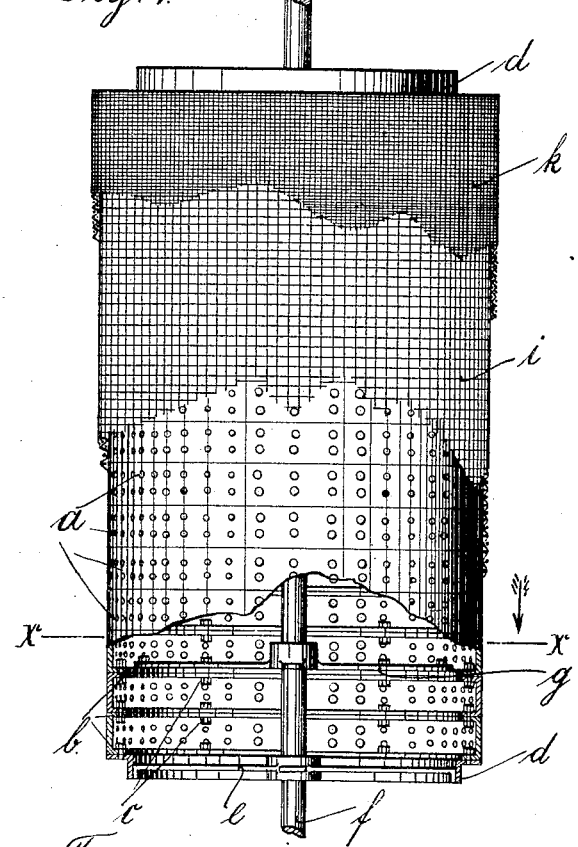
Figure 2:
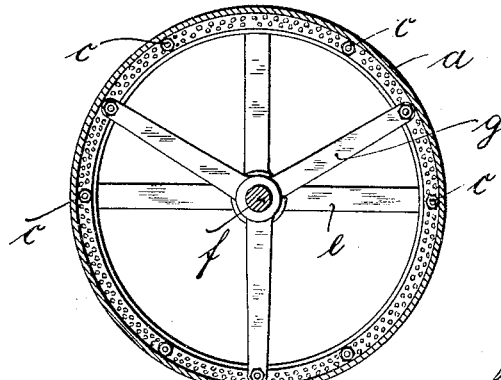

Figure 1 shows the sieve-cylinder partly in longitudinal section and partly in side view, and Fig. 2 a cross-section on the line $x$ $x$ of Fig. 1.

The sieve-cylinder is fundamentally constructed out of a number of rings $a$ of equal external diameter arranged side by side. The rings have a cylindrical middle part whose two edges are bent inward at right angles to form the flanges $b$ in a direction at right angles to the axis of the cylinder. The two adjoining flanges $b$, which lie close together with surfaces touching, are suitably connected one to the other by a number of screw-bolts suitably spaced around the circumference, the screw-bolts $c$ being such as will easily allow the rings to be disconnected when required. In the place of these screw-bolts countersunk screws or rivets may be used to connect the rings. The body of the cylinder is closed at the two ends by the angular rings $d$, which are fastened to the exterior flanges of the rings $a$ forming the cylinder by screw-bolts or the like. The rings are fastened on the shaft $f$ by means of cross-arms $e$. On the shaft $f$ between these two cross-arms $e$, of which that fixed to the angular ring on the right is not shown in the drawings, there are arranged other cross-arms $g$ at definite intervals. The outer ends of these cross-arms $g$ are firmly connected by screws with the flanges $b$ of each two adjoining rings, so that these cross-arms give the sieve-cylinder the necessary support.

The cylindrical middle part of the rings $a$ and also in addition the flanges $b$ are perforated in order to enable liquid to pass through. The rings themselves are suitably constructed out of sheets of proportionally thin metal sheet, which are bent into circular form and connected at their ends by welding or sweating, and the edges are bent in to form the flanges $b$ by rolling or other suitable means. By this construction is obtained great rigidity in conjunction with a low total weight in the cylinder, and the work of repairing or replacing rings or lengthening the cylinder is more rapidly carried out than in ordinary constructions. The coarse under sieve $i$ is stretched on the outer surface of the drum, composed of such rings as above, and it serves as a support for the special fine sieve $k$ of the sieve-cylinder. For an advantageous operation of the sieve-drum it is important in the described method of constructing the drum-body that all parts serving to stiffen the drum-surface, and especially the flanges $b$, should run parallel to the direction of motion of the drum-surface, so that in the motion of the sieve through the liquid or in the motion of the liquid inside the revolving cylinder the formation of water-whirls is prevented as much as possible, thereby rendering possible an increased speed of the sieve-drum and a correspondingly higher working capacity. The axial length of the rings can be selected as required, and this kind of ring-cylinder surface can also be composed of rings of varying axial length.

Having thus described the nature of my invention, what I claim is—

1. A sieve-cylinder for cylinder paper-making machines in combination with a number of circular perforated rings, means for fastening said rings together and thereby forming a cylindrical body, a coarse wire-gauze sieve covering the outer surface of the cylinder, a fine wire-gauze sieve placed over the latter and means of fastening the body to a central rotatable shaft substantially for the purpose as specified.

2. A sieve-cylinder for cylinder paper-making machines in combination with a number of circular perforated rings U-shaped in section the flanges thereof extending inward being fastened together by screw-bolts or the like and forming thereby a cylindrical body, a coarse wire-gauze sieve covering the latter and means for fastening the body to the central rotatable shaft within substantially for the purpose as specified.

3. A sieve-cylinder for cylinder paper-making machines in combination with a number of perforated circular rings U-shaped in section the flanges thereof extending inward being fastened together by screw-bolts or the like and forming thereby a cylindrical body, rings of angle-iron attached to the ends of the cylinder, sieves of wire-gauze of different degrees of fineness in the mesh covering the outer surface of the body and cross-arms connecting the drum-body and the end rings with the central rotatable shaft within substantially as described.

In witness whereof I have hereunto set my hand in presence of two witnesses.

LEOPOLD ZEYEN.

Witnesses:
 LEON ZEOKIN,
 P. V. V. DUNN.